(12) United States Patent
Nelson et al.

(10) Patent No.: US 8,177,872 B2
(45) Date of Patent: May 15, 2012

(54) RAINCAP PRECLEANER, MOTOR VEHICLE HAVING A RAINCAP PRECLEANER, AND METHOD FOR PRECLEANING AIR

(75) Inventors: Benny Kevin Nelson, Bloomington, MN (US); John David Kuhn, Richfield, MN (US); Nilabh Narayan, Maple Grove, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 1 day.

(21) Appl. No.: 12/863,903

(22) PCT Filed: Feb. 13, 2009

(86) PCT No.: PCT/US2009/034109
§ 371 (c)(1),
(2), (4) Date: Nov. 16, 2010

(87) PCT Pub. No.: WO2009/102988
PCT Pub. Date: Aug. 20, 2009

(65) Prior Publication Data
US 2011/0048368 A1 Mar. 3, 2011

Related U.S. Application Data

(60) Provisional application No. 61/066,028, filed on Feb. 14, 2008.

(51) Int. Cl.
*B01D 45/12* (2006.01)

(52) U.S. Cl. ............. 55/345; 55/385.3; 55/447; 55/456; 55/DIG. 28; 96/372; 95/272; 123/198 E (58) Field of Classification Search .................... 55/345, 55/385.3, 447, 456, DIG. 28; 96/372; 95/272; 123/198 E
See application file for complete search history.

(56) References Cited

U.S. PATENT DOCUMENTS

| | | | |
|---|---|---|---|
| 2,661,810 A | 12/1953 | Heth | |
| 3,791,112 A | 2/1974 | Lidstone | |
| 3,807,144 A * | 4/1974 | Graybill | ......................... 96/292 |
| 4,198,217 A | 4/1980 | Erdmannsdorfer | |

(Continued)

FOREIGN PATENT DOCUMENTS

EP 1 364 695 11/2003
(Continued)

*Primary Examiner* — Jason M Greene
*Assistant Examiner* — Dung H Bui
(74) *Attorney, Agent, or Firm* — Merchant & Gould P.C.

(57) ABSTRACT

A raincap precleaner is provided according to the present invention. The raincap precleaner includes a sleeve, a cover, and a precleaner assembly. The sleeve is constructed for mounting on an air intake stack and has an air intake flow region for delivering intake air to the air intake stack. The cover includes a top portion having an annular circumference and a depending flange portion extending from the annular circumference of the top portion. The cover is arranged relative to the sleeve to provide a precleaner area and a precleaned air chamber. The precleaner assembly is provided extending around a periphery of the sleeve and in the precleaner area so that environmental air flows through the precleaner assembly and into the precleaned air chamber, and from the precleaned air chamber into the air intake flow region. The precleaner assembly comprises a plurality of inertial separators. A method for precleaning air and a motor vehicle are provided.

22 Claims, 10 Drawing Sheets

U.S. PATENT DOCUMENTS

| | | | |
|---|---|---|---|
| 4,218,223 A * | 8/1980 | Lidstone et al. | 95/271 |
| 4,242,115 A | 12/1980 | Harold et al. | |
| 4,746,340 A | 5/1988 | Durre et al. | |
| 6,350,291 B1 | 2/2002 | Gieseke et al. | |
| 7,004,986 B2 | 2/2006 | Kopec et al. | |
| 7,008,467 B2 | 3/2006 | Krisko et al. | |
| 2009/0183709 A1* | 7/2009 | Kubo et al. | 123/198 E |
| 2010/0154368 A1 | 6/2010 | Kopec et al. | |

FOREIGN PATENT DOCUMENTS

| | | |
|---|---|---|
| FR | 2 402 774 | 4/1979 |
| GB | 719 160 | 11/1954 |
| JP | 60-190659 | 9/1985 |
| JP | 2001-50123 | 2/2001 |
| JP | 2007-154705 | 6/2007 |
| RU | 2 218 474 | 12/2003 |
| WO | WO 2007/000397 | 1/2007 |

* cited by examiner

RAINCAP PRECLEANER, MOTOR VEHICLE HAVING A RAINCAP PRECLEANER, AND METHOD FOR PRECLEANING AIR

This application is being filed on 21 Jul. 2010, as a US National Stage of PCT International Patent application No. PCT/US2009/034109, filed 13 Feb. 2009 in the name of Donaldson Company, Inc., a U.S. national corporation, applicant for the designation of all countries except the US, and Benny Kevin Nelson, John David Kuhn, and Nilabh Narayan, all citizens of the U.S., applicants for the designation of the US only, and claims priority to U.S. Provisional patent application Ser. No. 61/066,028, filed Feb. 14, 2008 and which applications are incorporated herein by reference. To the extent appropriate, a claim of priority is made to each of the above disclosed applications.

CROSS-REFERENCE TO RELATED APPLICATION

The present application includes the disclosure of U.S. Provisional Application No. 61/066,028 that was filed with the U.S. Patent and Trademark Office on Feb. 14, 2008. A priority right is claimed to U.S. Provisional Application No. 61/066,028, to the extent appropriate. The complete disclosure of U.S. Provisional Application No. 61/066,028 is incorporated herein by reference.

FIELD OF THE INVENTION

The present invention relates to a raincap precleaner, a motor vehicle having a raincap precleaner, and a method for precleaning air prior to cleaning the air in a primary filter element. More particularly, the raincap precleaner can be provided covering the air intake opening of a vertically arranged duct or stack, and used for precleaning environmental air for the removal of relatively large particulates and water to provide precleaned air that can be processed through an air cleaner to provide cleaned air suitable for use in an engine such as an internal combustion engine.

BACKGROUND

It is desirable to remove particulates and water from air prior to introducing the air into an internal combustion engine. In certain environments, it is advantageous to include a precleaner for removing water and larger sized particulates prior to cleaning the air in an air cleaner. Removing water and larger size particulates from an air stream fed to an air cleaner has a tendency to help prolong the life of the main or primary filter element inside the air cleaner. Precleaners are often provided as part of an air cleaner. Exemplary disclosures of air cleaners containing a precleaner include U.S. Pat. No. 7,008,467, U.S. Pat. No. 6,350,291, European Patent No. EP 1 364 695, and PCT Publication No. WO2007/000397. Because air cleaners for engines are often located in the engine compartment of a motor vehicle, there is limited space for a precleaner.

The engine air intake for motor vehicles used in agricultural and construction industries is commonly located above the hood line of the vehicle to obtain a source of air that is a reasonable distance away from the tool being used (e.g., the tool turning the soil or modifying the earth grade in the example of agricultural or construction equipment). This provides an air source that is lower in dust concentration than the air immediately adjacent to the engine compartment. This location necessitates a duct that is oriented vertically to direct the air in a downward direction toward the hood (if so equipped) and subsequently to the remainder of the engine air intake components. A vertically oriented duct or stack is typically fitted with a raincap to prevent rain and other falling objects from being ingested directly into the vertical duct or stack. A typical raincap is commonly fitted with a cap to deflect rain, and an annular aperture to allow for the introduction of air into the cavity between the cap and the vertical duct or stack. The annular aperture is commonly sized to allow the environmental air to be introduced at a relatively low velocity (typically less than 600 fpm) to allow larger droplets and objects to fall out of the airflow before entering the cavity beyond the annular aperture. The air then turns approximately 180 degrees within the cavity as it enters the vertical duct or stack and is conveyed to the next component of the engine air intake system.

Exemplary precleaners that are referred to as inertial separators or centrifugal separators are manufactured by Donaldson Company Inc and are available under the name Donaldson Strata™ Tubes and Panels. Exemplary inertial separators are disclosed by U.S. Pat. No. 4,242,115 and U.S. Pat. No. 4,746,340.

SUMMARY

A raincap precleaner is provided according to the present invention. The raincap precleaner includes a sleeve, a cover, and a precleaner assembly. The sleeve is constructed for mounting on a vertically arranged air intake stack and has an air intake flow region for delivering intake air to the air intake stack. The cover includes a top portion having an annular circumference and a depending flange portion extending from the annular circumference of the top portion. The cover is arranged relative to the sleeve to provide a precleaner area and a precleaned air chamber. The precleaner assembly is provided extending around a periphery of the sleeve and in the precleaner area so that environmental air flows through the precleaner assembly and into the precleaned air chamber, and from the precleaned air chamber into the air intake flow region. The precleaner assembly comprises a plurality of inertial separators.

A method for precleaning intake air is provided according to the present invention.

A motor vehicle comprising an air intake system is provided according to the present invention.

DETAILED DESCRIPTION OF THE PREFERRED EMBODIMENT

Figure 1:
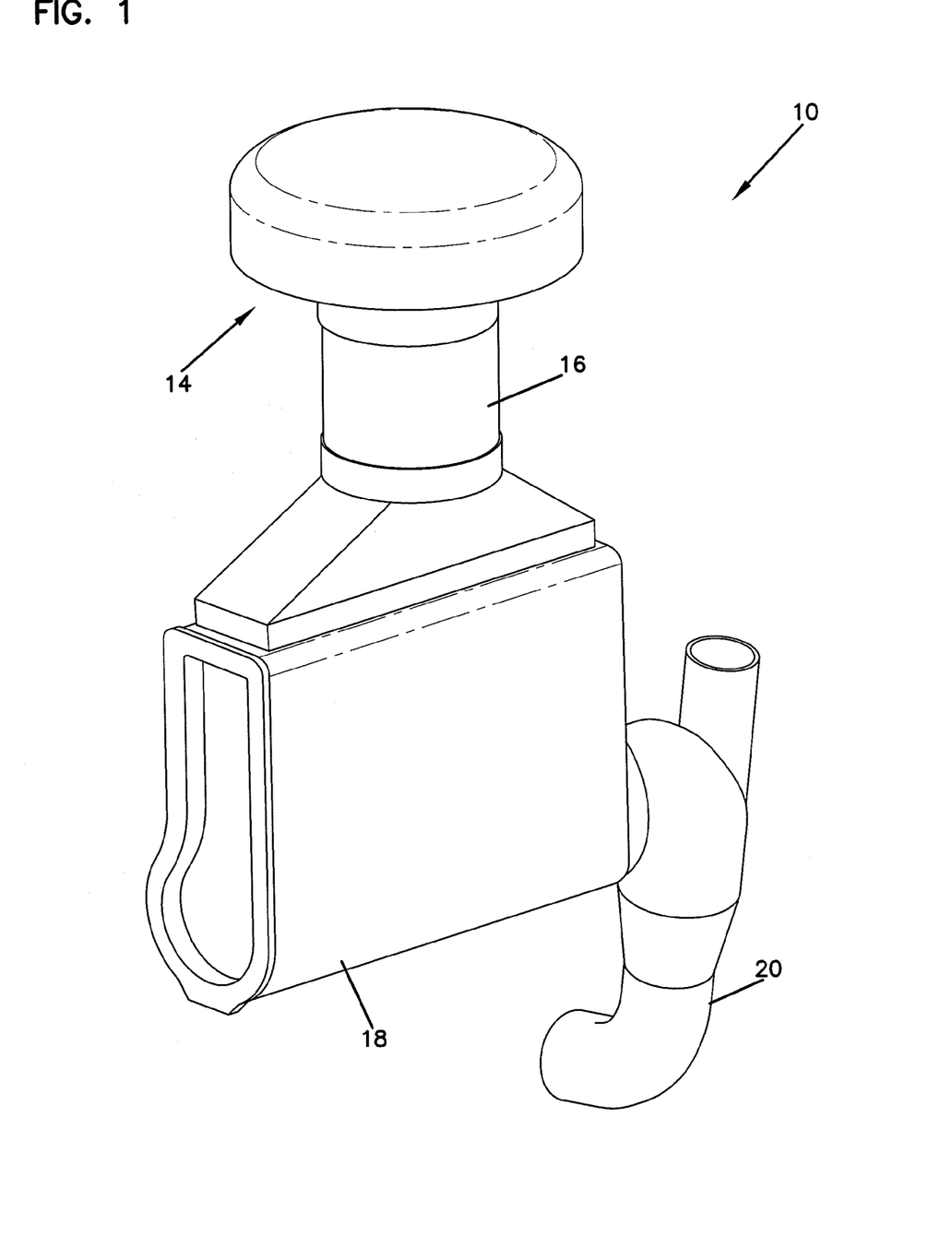
FIG. 1 is a perspective view of an air intake system for a motor vehicle containing an air cleaner and an air inlet stack having a raincap precleaner according to the principles of the present invention.

Now referring to FIG. 1, an air intake system is shown at reference number 10. In general, the air intake system 10 is provided for receiving environmental air and cleaning the environmental air for the removal of water and particulates so that the cleaned air can be used by an engine such as an internal combustion engine. The air intake system 10 includes a raincap precleaner 12 that receives environmental air through an annular opening 14 and provides precleaned air that flows through the vertical duct or stack 16 and into the air cleaner 18 where the air is cleaned to provide clean air that flows through the clean air outlet 20. The resulting clean air can then be used in an engine such as an internal combustion engine. The air cleaner 18 can be provided as any type of air cleaner that provides sufficient cleaning of air to remove dust and particulates so that the resulting clean air can be used in an engine. Exemplary air cleaners that can be used include those available from Donaldson Company, Inc.

The raincap precleaner 12 is designed for use with the vertical duct or stack 16. The vertical duct or stack 16 can be referred to as a vertically arranged air intake stack. In general, the vertically arranged air intake stack extends above the hood of a motor vehicle (if there is a hood) so that the vertically arranged stack draws environmental air from a location that is relatively free of dust compared with a location closer to the engine. For example, there may be a greater concentration of dust or particulates closer to the ground. The vertically arranged air intake stack includes a mouth or opening for receiving environmental air. The raincap precleaner 12 helps protect that opening from receiving water and debris.

The raincap precleaner 12 is provided to remove water and relatively large or heavy particulates from the environmental air to thereby extend the life of the main or primary filter element in the air cleaner 18. Precleaners are often provided as part of an air cleaner. For example, see U.S. Pat. No. 7,008,467, U.S. Pat. No. 6,350,291, European Patent No. EP 1 364 695, and PCT Publication No. WO2007/000397. By moving the precleaner to a location away from the air cleaner, it is possible to provide design alternatives for the air cleaner or other equipment near the air cleaner that may enhance vehicle performance. For example, the primary filter element can be increased in size, if desired. Alternatively, more room can be available for other equipment.

Now referring to FIGS. 2-6, a raincap precleaner is shown at reference number 30. The raincap precleaner 30 includes a cover 32, a sleeve 34, and a precleaner assembly 36 located in a precleaner area 38 provided in an annular opening 39 between the cover 32 and the sleeve 34. The raincap precleaner 30 can additionally include a screen or sieve 40 and a scavenge outlet 42. In general, the screen or sieve 40 helps protect the precleaner assembly 36 and helps reduce very large particulates including, for example, leaves and twigs, from entering the precleaner assembly 36. The scavenge outlet 42 can be provided in connection with a scavenge airflow source such as a vacuum hose, venturi, or fan to draw particulates separated from the environmental air out of the precleaner assembly 36. If desired, the scavenge airflow source can be an exhaust driven scavenge source.

The cover 32 includes a top portion 44 and a depending flange portion 46. In general, the top portion 44 provides a roof over the vertical duct or stack to which the sleeve 34 attaches so that air and particulates do not fall directly into the vertical duct or stack. The top portion 44 includes a center area 43 and a peripheral area 45. In general, the top portion 44 can provide a slant or cant outwardly from the center area 43 to help shed water. Alternatively, the top portion 44 can be provided as relatively flat. The peripheral area 45 can be provided around the periphery of the top portion 44 and can be provided having a curve 48, if desired, where the top portion 44 joins the depending flange portion 46. The depending flange portion 46 includes a bottom edge 50 that overlaps or extends beyond the upper edge 52 of the sleeve 34 that attaches to the vertical duct or stack. The upper edge 52 of the sleeve 34 refers to the uppermost part of the sleeve 34 above which the precleaned air must travel in order to enter into the vertical duct or stack when the raincap precleaner is attached to the vertical duct or stack. In addition, because the sleeve 34 can be considered an extension of the vertical duct or stack, the upper edge 52 can be considered the uppermost portion of the vertical duct or stack. In general, it is desirable for the bottom edge 50 of the depending flange portion 46 to extend beyond the top edge 52 by an amount sufficient to allow for placement of the precleaner assembly 36 in the precleaner area 38. Preferably, the bottom edge 50 extends beyond the top edge 52 by an amount sufficient to provide a precleaner area 38 that contains the precleaner assembly 36 without the precleaner assembly 36 extending beyond the top edge 52 or beyond the bottom edge 50.

The cover 32 can be constructed so that the depending flange portion 46 is provided a sufficient distance away from the sleeve 34 to provide the precleaner area 38 with sufficient room to fit the precleaner assembly 36. That is, the depending flange portion 46 and the sleeve 34 should be sufficiently separated to fit the precleaner assembly 36 therebetween. Furthermore, the precleaner assembly 36 can be sized to accommodate a desired air flow rate therethrough. The depending flange portion 46 and the sleeve 34 can provide an annular area 60 within the precleaner area 38. The annular area 60 extends circumferentially around the sleeve 34 and inside of the depending flange portion 46 and is sized sufficiently to receive the precleaner assembly 36 so that environmental air enters the annular area 60 through the annular area first side 62 and precleaned air exits the annular area 60 through the annular area second side 64. Once precleaned air exits the annular area 60 via the annular area second side 64, the precleaned air enters a precleaned air chamber 66 and turns to flow downwardly through the sleeve 34 and into the vertical duct or stack. The area within the sleeve 34 through which the precleaned air travels can be referred to as the air intake flow region 67. The precleaned air entering the precleaned air chamber 66 can turn about 180° as it enters into the air intake flow region 67 within the sleeve 34 or the vertical duct or stack. While the precleaner area 38 can be sized so that the environmental air flows into the precleaner assembly at any desired rate, an exemplary desired rate for many motor vehicles is a relatively low velocity of less than about 600 fpm. The rate of air flow into the precleaner assembly refers to the rate at which the environmental air passes into the precleaner assembly 36.

The precleaner assembly 36 can comprise a plurality of inertial separators 70. In general, an inertial separator 70 uses inertial forces to separate liquid and particulates from the environmental air. Suitable inertial separators are available from Donaldson Company, Inc. under the name Strata™ Tube. Exemplary inertial separators that can be used include those described in, for example, U.S. Pat. No. 4,242,115, U.S. Pat. No. 4,746,340, and U.S. Pat. No. 7,008,467, the entire disclosures of which are incorporated herein by reference.

The plurality of inertial separators 70 can be provided as an inertial separator panel 72 having the inertial separators 70 extending between a first wall 76 and a second wall 78. The inertial separator panel 72 can be provided within the precleaner area 38 and sealed so that a vacuum can be drawn in the scavenging air chamber 80 to help draw particulates and water out of the scavenging air chamber 80 via the scavenge outlet 42. A seal can be provided between the first wall 76 and the depending flange portion 46 and the sleeve 34, and between the second wall 78 and the depending flange portion 46 and the sleeve 34. The seal can be provided as an o-ring seal or any other variety of seal arrangement, such, for example, radial seals or axially seals or both.

The inertial separators 70 provide initial separation of water (if present) and relatively large or heavy particulates as a result of inertial or centrifugal forces. When the air enters the inertial separator, the air is moved through an arcuate path thus imparting centrifugal forces to the water and particulates that are denser than the air and thus separating the water and particulates from the air. The relatively cleaner air then flows axially out of the inertial separators 70 and into the precleaned air chamber 66. A portion of the air containing water (if present) and the relatively larger particulates exit the inertial separator 70 and flows into the scavenging chamber 80 where they are drawn out through the scavenge outlet 42.

The inertial separator panel 72 includes a plurality of inertial separators 70 arranged to receive environmental air through a first opening 82, discharge precleaned air through a second opening 84, and discharge water and particulates through a scavenge opening 86. The first opening 82 can be referred to as the environmental air opening. The second opening 84 can be referred as the precleaned air opening. Environmental air entering the first opening 82 is directed in a swirling motion as a result of the stationary veins 88. The swirling motion then causes the generally heavier particulates and liquid to move toward the inertial separator chamber wall 90 as the air moves from the first opening 82 to the second opening 84, precleaned air flows axially out the second opening 84, and water and particulates have a tendency to leave through the scavenge opening 86.

Figure 7:
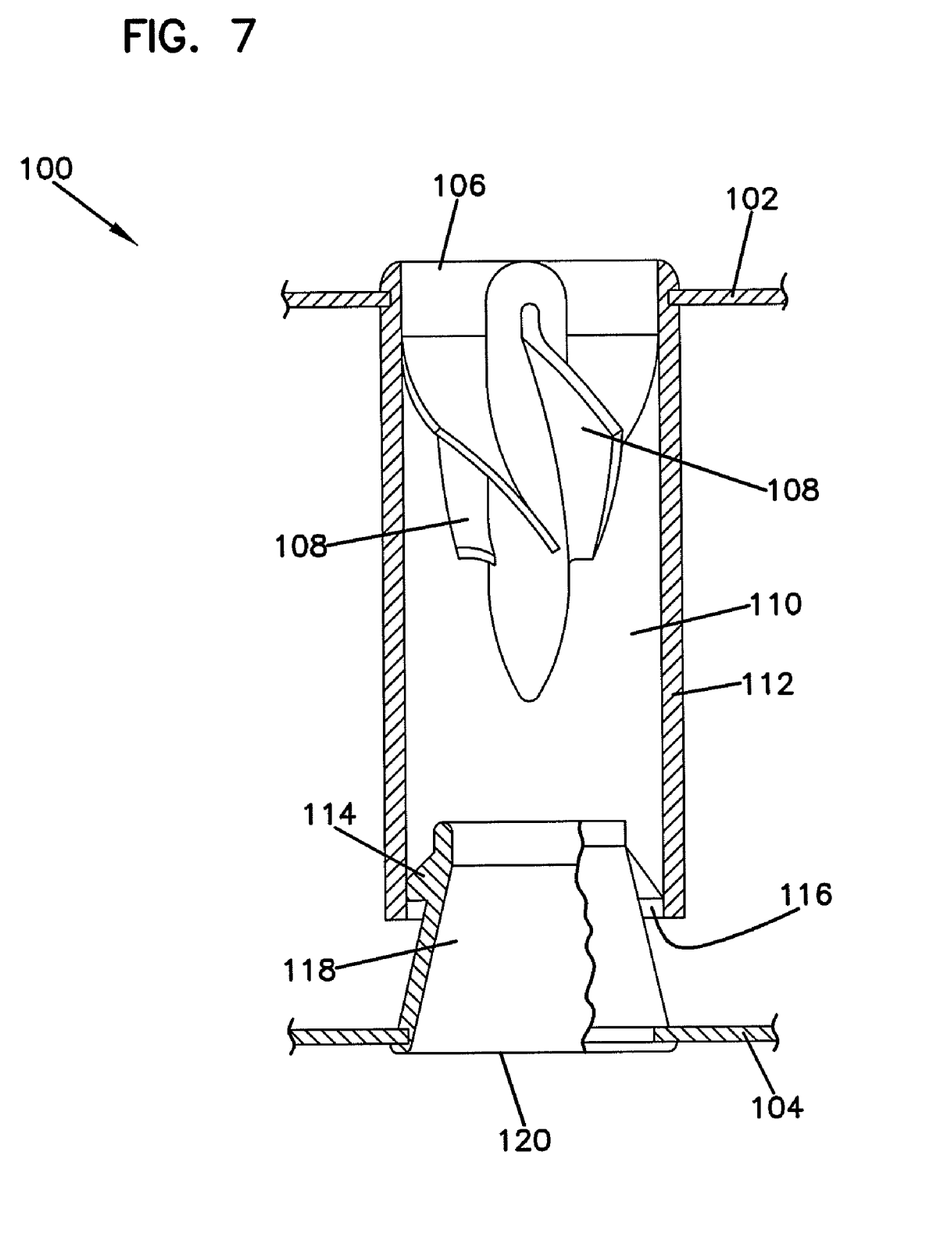
FIG. 7 is a partial sectional view of an exemplary inertial separator.

Now referring to FIG. 7, and exemplary inertial separator is shown at reference number 100. The inertial separator 100 can be held in place a first wall 102 and a second wall 104. Environmental air can enter the inertial separator 100 through the first opening 106, and stationary veins 108 can cause the environmental air to swirl within the chamber 110. Particulates and water, as a result of centrifugal forces, have a tendency to move toward the chamber wall 112. As the air moves through the chamber 110, the water and particulates are directed as a result of the ramp 114 to the scavenge opening 116. Air within the center of the chamber 110 moves into a secondary chamber 118 and out the second opening 120. The chambers 110 and 118 can have a cross-sectional area that is conical or tapered, if desired.

Figure 4:
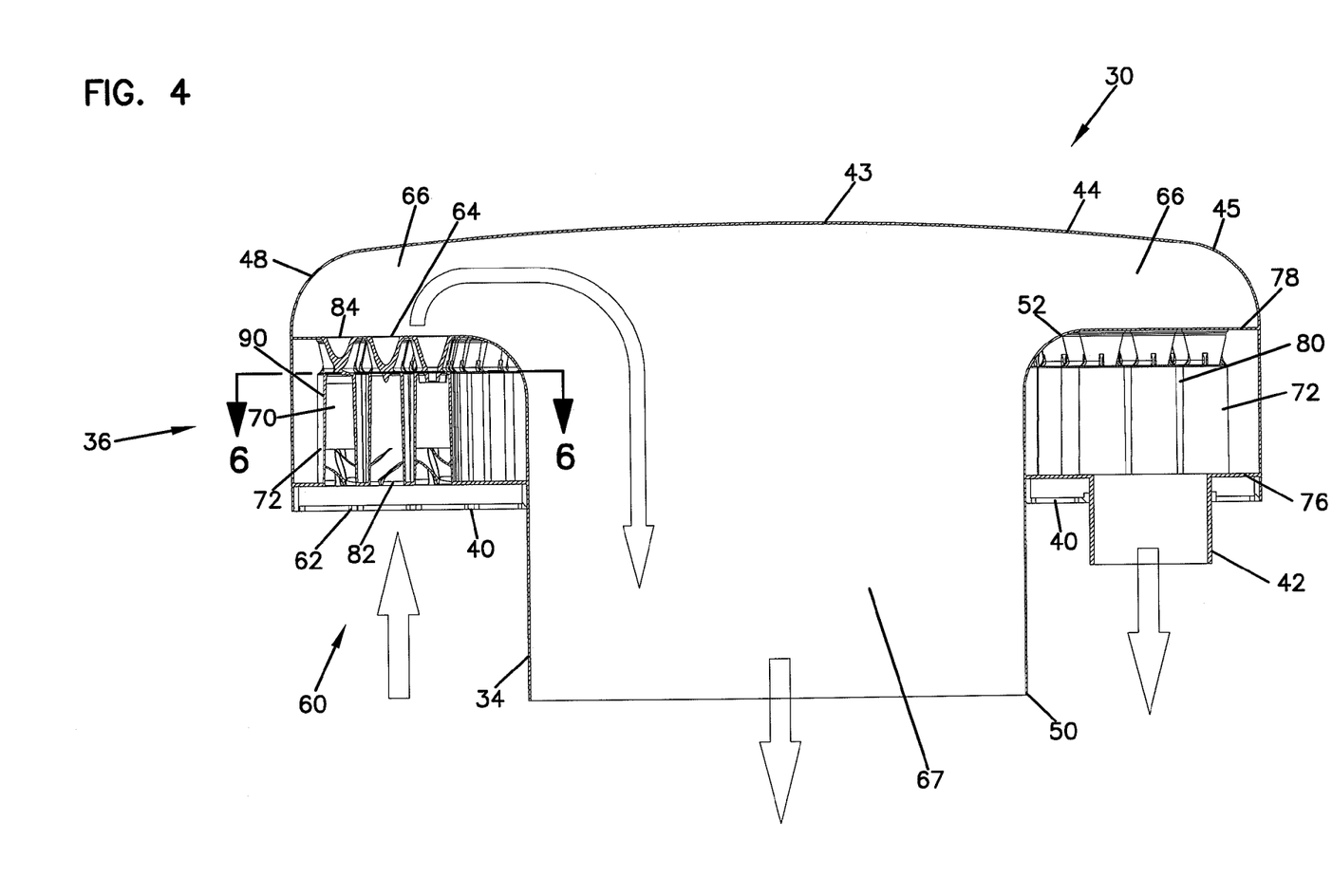
FIG. 4 is a sectional, side view of the raincap precleaner according to FIG. 2.
Figure 5:
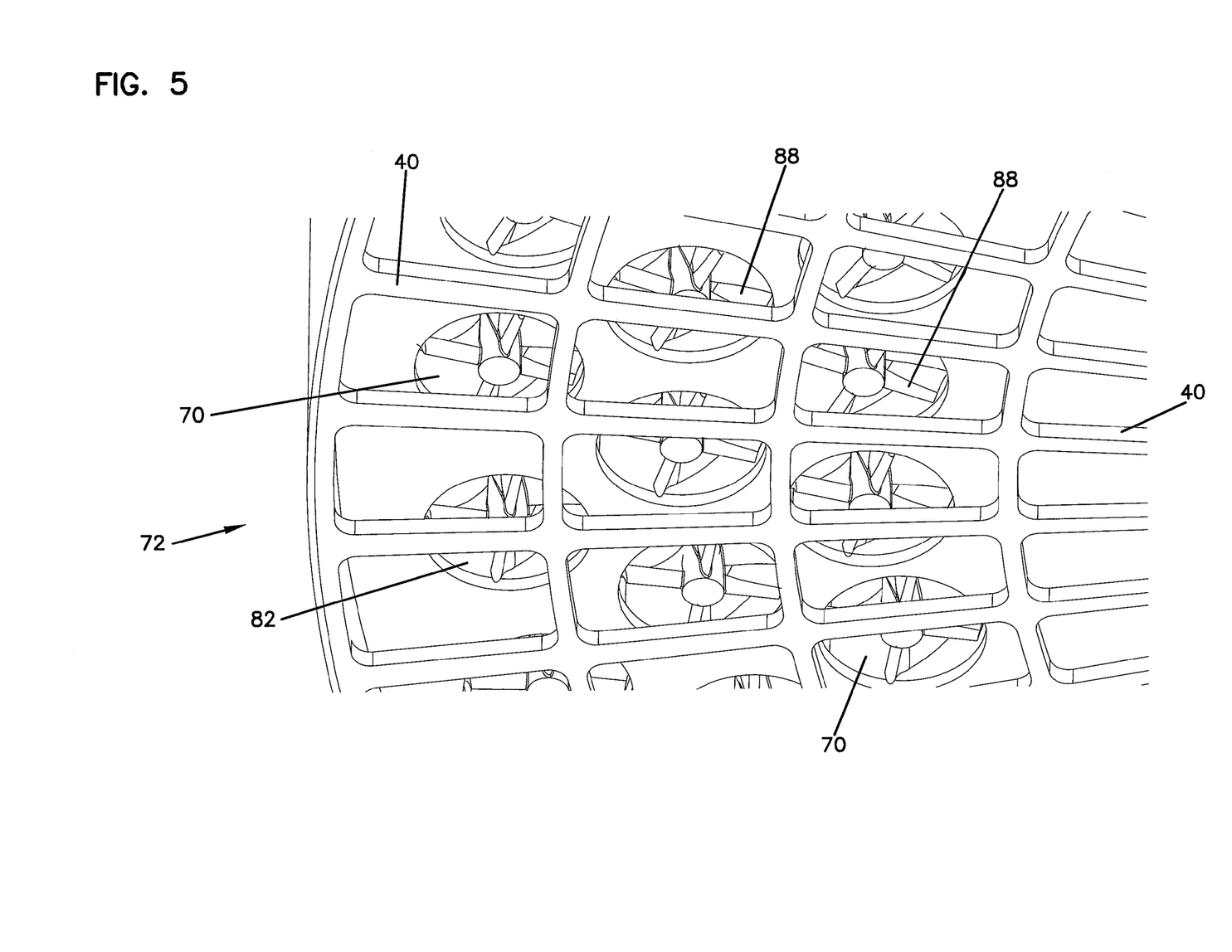
FIG. 5 is a detail view of a portion of the raincap precleaner identified in FIG. 3.
Figure 6:
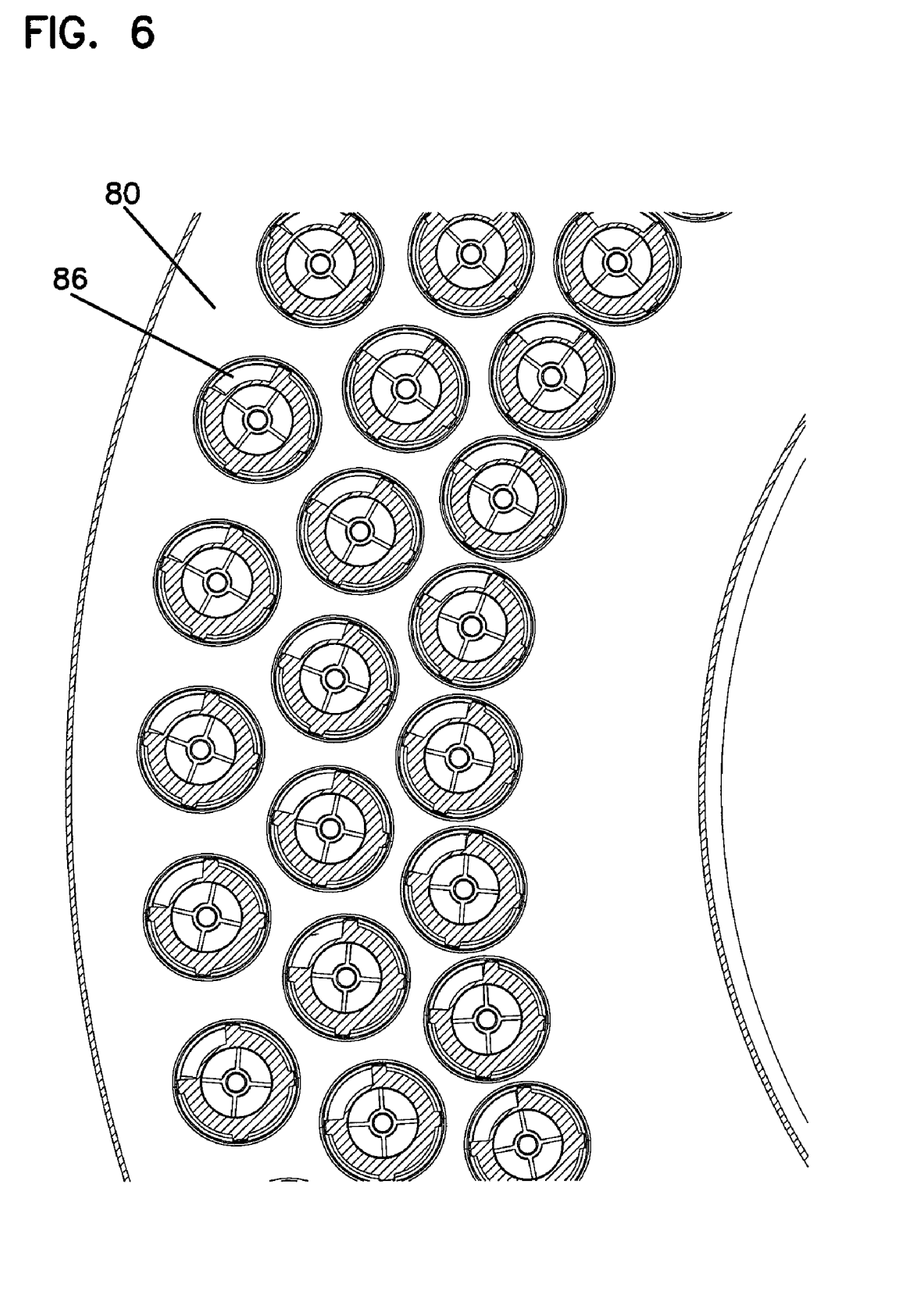
FIG. 6 is a detail view of a portion of the raincap precleaner shown in FIG. 4.

Now referring to FIG. 4, environmental air enters the raincap precleaner 30, is subjected to precleaning as a result of the inertial separators 70, then enters into the precleaned air chamber 66 where it turns and flows into the air intake region 67 of the sleeve 34 and into the vertical duct or stack. The general direction of the air flow is shown by the arrows. Furthermore, the particulates and water flow out of the scavenge outlet 42 as shown by the arrow. As shown by the arrows in FIG. 4, when the raincap precleaner 30 is mounted on a vertically arranged stack, the environmental air flows vertically upward into the precleaner assembly 36, and precleaned air enters the precleaned chamber 66 and turns to flow downward into the air intake region 67. As a result of this arrangement, the flow path of the environmental air through the precleaner and into the vertically arranged stack can be characterized as about a 180° turn.

Figure 2:
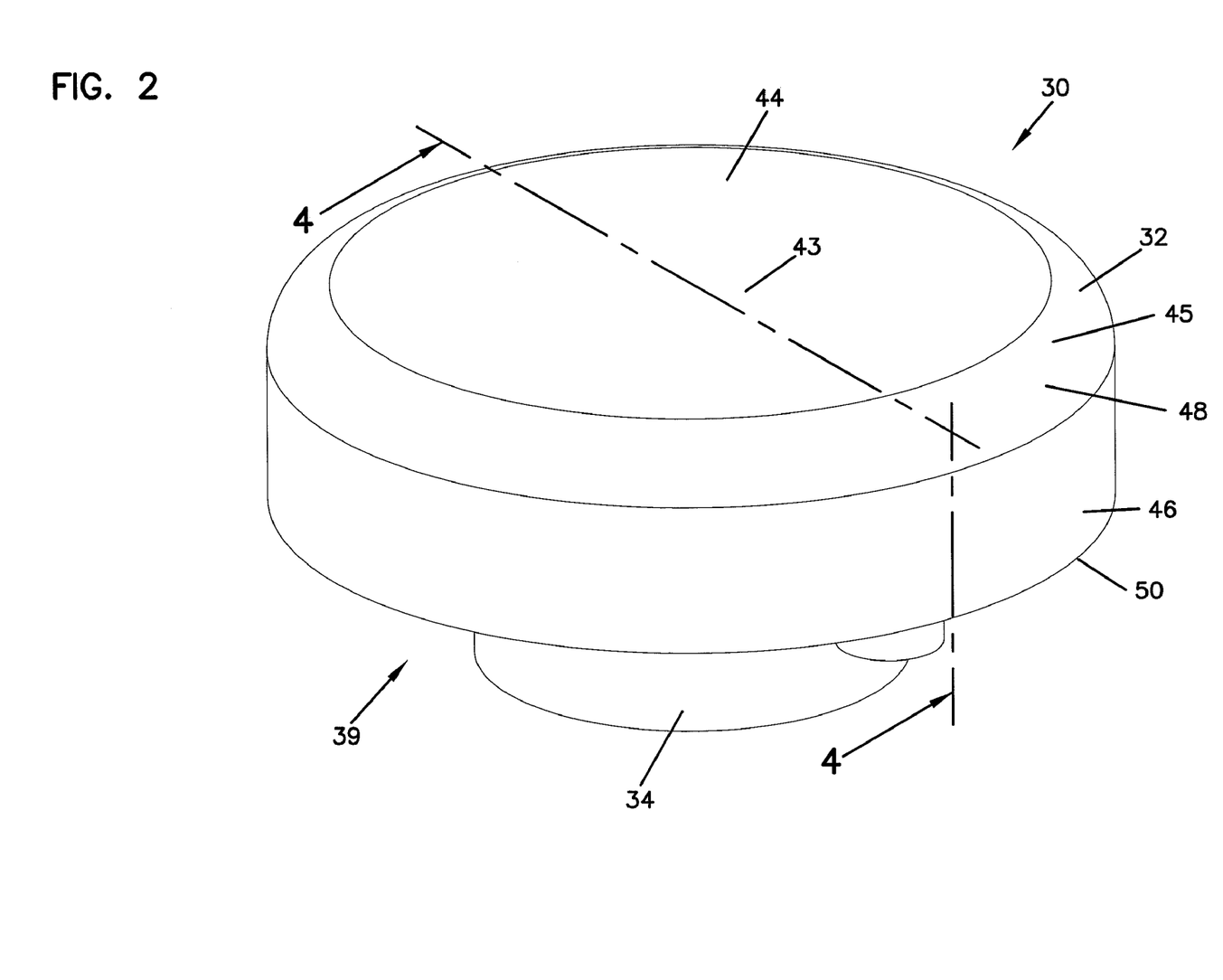
FIG. 2 is a perspective top and side view of a raincap precleaner according to the principles of the present invention.
Figure 3:
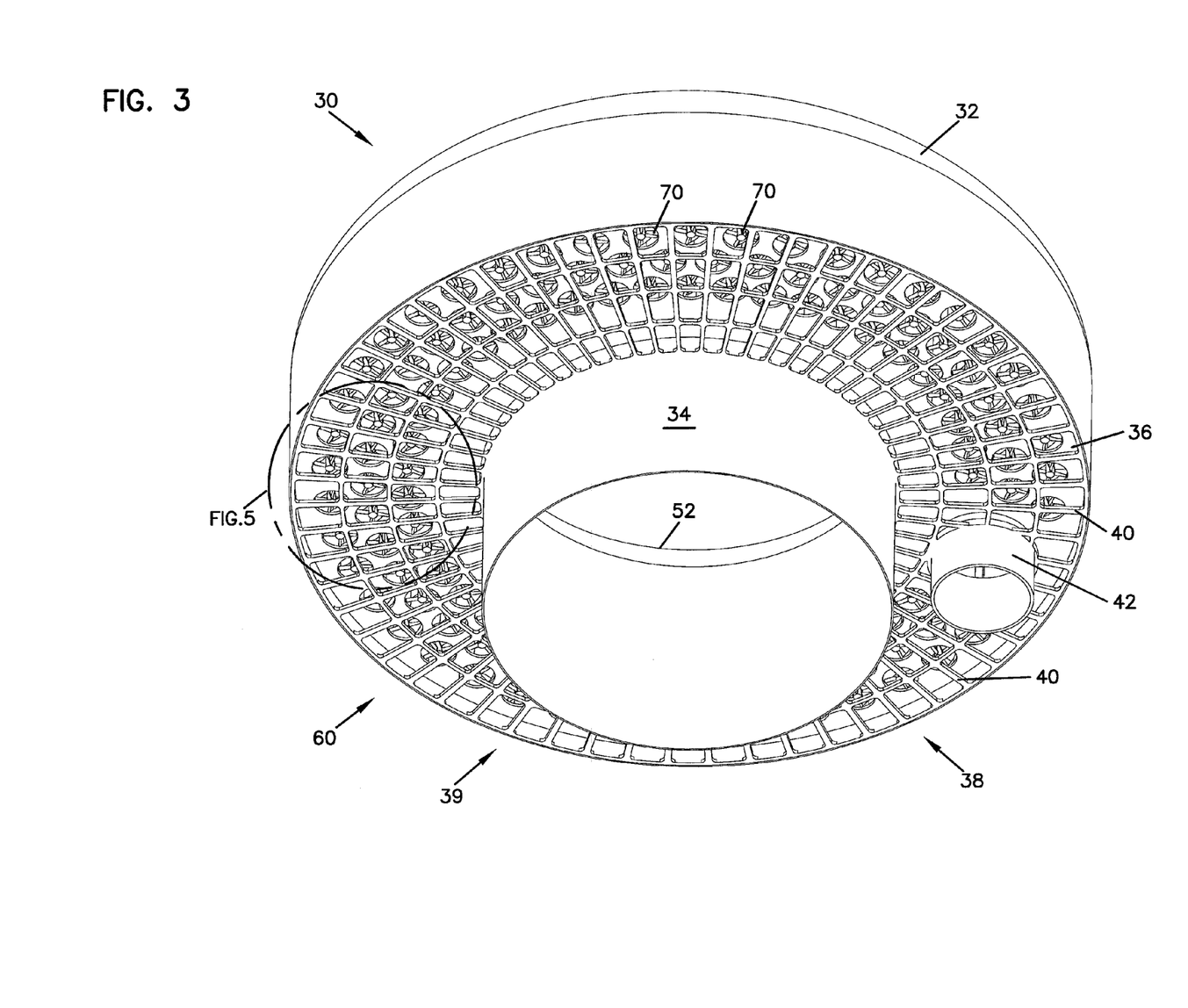
FIG. 3 is a perspective bottom and side view the raincap precleaner according to FIG. 2.

The screen 40 can be provided to reduce debris from plugging the various flow paths of the inertial separators 70. In general, the smallest opening in the flow path is typically the opening where the scavenge flow exits the inertial separators 70 and enters the scavenge chamber 80. Accordingly, it can be desirable to select an opening for the screen that is nominally equal to or smaller than this smallest opening in the scavenge tube flow path to reduce plugging of the scavenge tube opening with debris. Furthermore, the screen can be selected so that the desired air flow velocity through the screen can be maintained. A common guideline for various motor vehicles utilizing a vertical duct or stack for inlet air is a flow velocity of about 500 fpm to about 1,000 fpm. If desired, the screen can be provided as a wire screen, a plastic screen, or a perforated screen.

The raincap precleaner can be provided as a serviceable item. Various ways to service the raincap precleaner can be provided, for example, the cover 32 can be removed to access the precleaner assembly 36. Furthermore, the screen 40 and the first wall 76 can be removed to access the inertial separators 70. Cleaning of the inertial separators can be accomplished using a vacuum or compressed air. An advantage of having the inertial separators within the raincap is the ability to conveniently inspect the inertial separators in order to determine whether the inertial separators require cleaning. One can simply look into the inertial separators to see whether there is a clog or plug that is disrupting or preventing desired flow.

An advantage of having the inertial separators within the raincap is the presence of greater efficiency. In general, inertial separators have a tendency to perform more efficiently when drawing air from an environment without having to alter the flow pattern of the air. For example, air flowing through a duct may require re-orientation. As a result, it is likely that inertial separators present in a raincap may perform more efficiently compared with inertial separators receiving air from a duct. Furthermore, inertial separators within a raincap may have a better opportunity to separate water from the environmental air compared with inertial separators receiving air via a duct. One reason for this is that water may have an ability to become entrained as a result of flow through a duct. An additional advantage of having the inertial separators within the raincap is that gravity may assist with reducing the amount of large particulates that become trapped at the inertial separator openings. Because of the force of gravity, larger particulars may fall away from the inertial separator openings.

Figure 8:
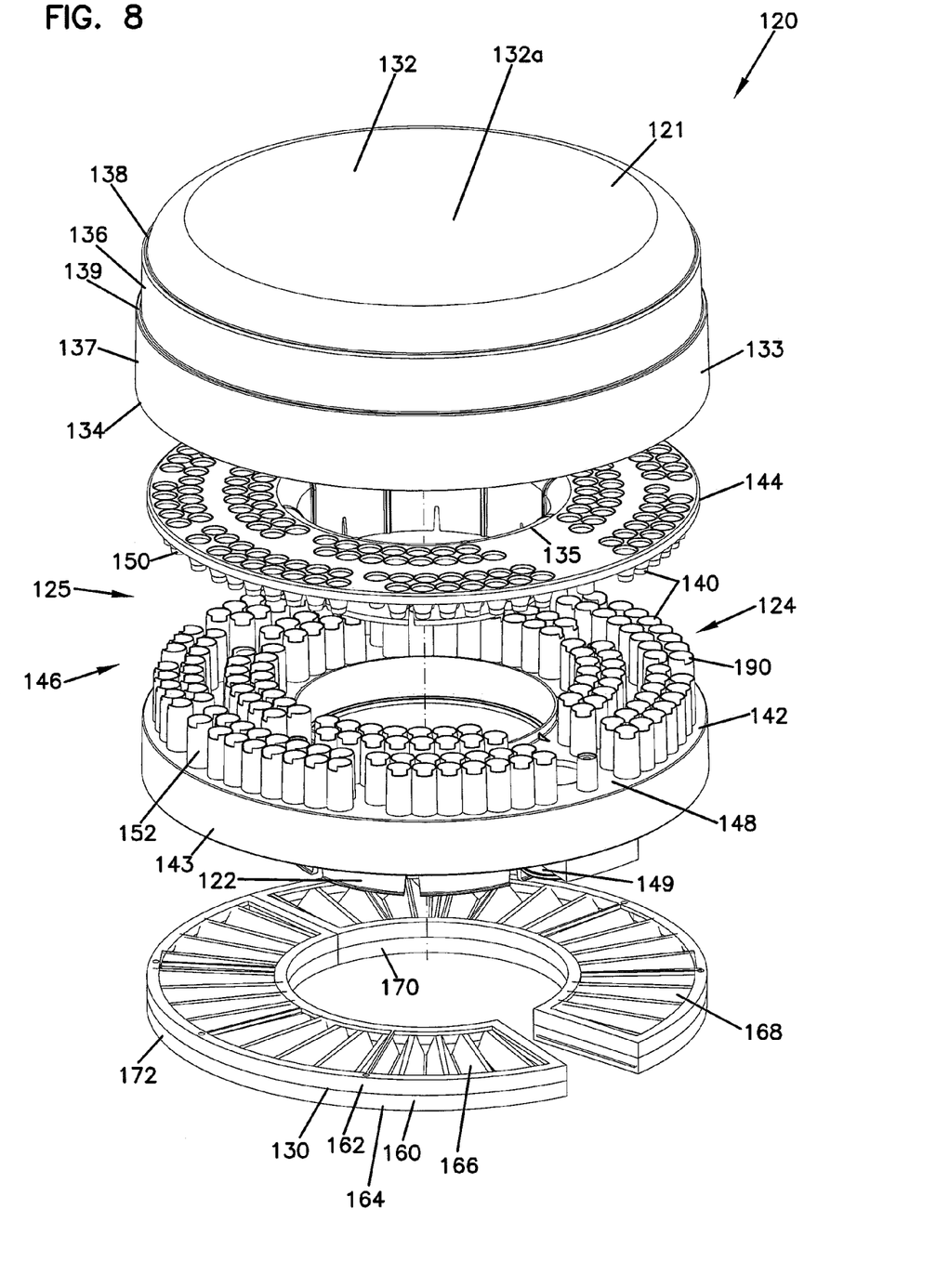
FIG. 8 is an exploded view of an alternative embodiment of a raincap precleaner according to the principles of the present invention.
Figure 9:
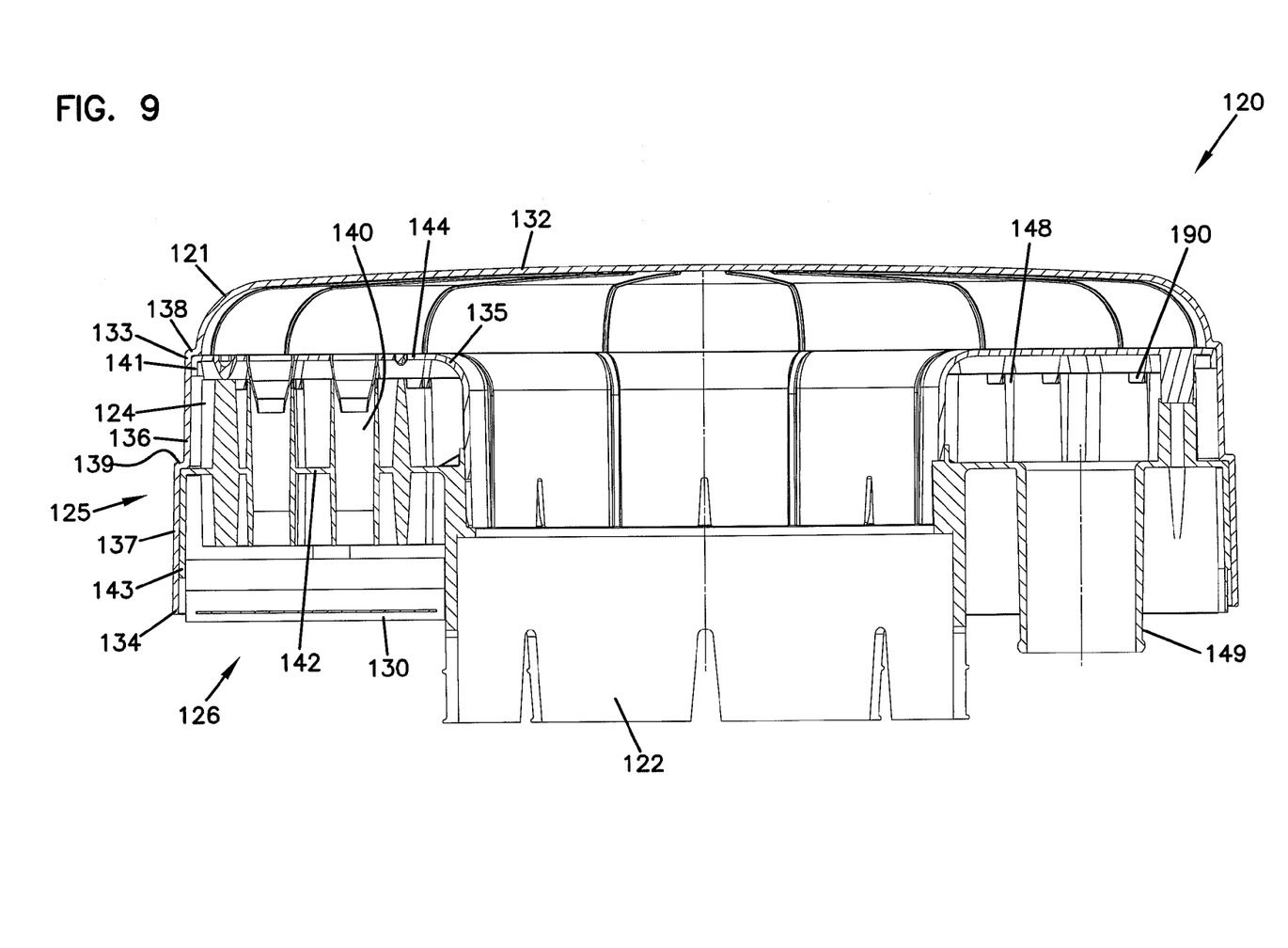
FIG. 9 is a sectional view of the raincap precleaner according to FIG. 8.

Now referring to FIGS. 8 and 9, an alternative embodiment of a raincap precleaner is shown at reference number 120. The raincap precleaner 120 includes a cover 121, a sleeve 122, a precleaner assembly 124 located in a precleaner area 125 provided in an annular opening 126 between the cover 121 and the sleeve 122, and a screen or sieve 130 through which environmental air passes.

The cover 121 includes a top portion 132 and a depending flange portion 133. The top portion 132 provides a roof over the vertical duct or stack to which the sleeve 122 attaches, and can be flat or provide a slant or cant outwardly from the center area 132a to help shed water. The depending flange portion 133 can include a bottom edge 134 that overlaps or extends beyond the upper edge 135 of the sleeve 122. In addition, the depending flange portion 133 can include a first fitted area 136 and second fitted area 137 for receiving the precleaner assembly 124. The first fitted area 136 includes a first radially extending ridge 138, and the second fitted area 137 includes a second radially extending ridge 139.

The precleaner assembly 124 includes a plurality of inertial separators 140 extending from a first wall 142 to a second wall 144. The plurality of inertial separators 140 and the first wall 142 and second wall 144 can be referred to as an inertial separator panel 146. The inertial separator panel 146 can be provided within the precleaner area 125 and sealed so that a vacuum can be drawn in the scavenging air chamber 148 to help draw particulates and water out of the scavenging air chamber 148 via the scavenge outlet 149. The plurality of inertial separators 140 can be provided as a two-part construction that includes a first part 150 and a second part 152. The first part 150 can be provided as part of the second wall 144, and the second part 152, can be provided as part of the first wall 142. When the first wall 142 and the second wall 144 are combined, the first part 150 fits within the second part 152 to form individual inertial separators. In addition, the second wall 144 can be provided so that it fits within or adjacent to the first fitted area 136 and the first radially extending ridge 138. In addition, the first wall 142 can be provided so that it extends within or adjacent to the second fitted area 137 and the second radially extending ridge 139. The first wall 142 can include a depending flange 143 that can fit within the second fitted area 137. Similarly, the second wall 144 can include a depending flange 143 that can fit within the first fitted area 136.

The screen or sieve 130 can be provided as a pleated screen construction 160. The pleated screen construction can include a first screen member 162, a second screen member 164, and a screen 166. For the pleated screen construction 160, the screen 166 is provided as a pleated screen 168 that fits between the first screen member 162 and the second screen member 164. When fitted together, the pleated screen construction 160 includes an inner annular portion 170 that fits around the sleeve 122, and an outer annular portion 172 that fits within the precleaner assembly 124 or, alternatively, within the cover 121. The pleated screen 168 can be provided as a pleated metallic screen or as a pleated plastic screen or as a pleated screen formed from another material such as, if desired, ceramic. In general, by providing a pleated screen, it is possible to enhance or increase air flow therethrough while filtering out smaller particulates than those that can be filtered out by, for example, the screen 40. The particulates that can be filtered out include particulates that would interfere with the relatively small scavenge opening in the plurality of inertial separators 140. By way of example, the first screen member 162 and the second screen member 164 can be manufactured by injection molding, and the pleated screen 168 can be fit therebetween. The resulting pleated screen construction can be secured in place by using a fastener.

Figure 10:
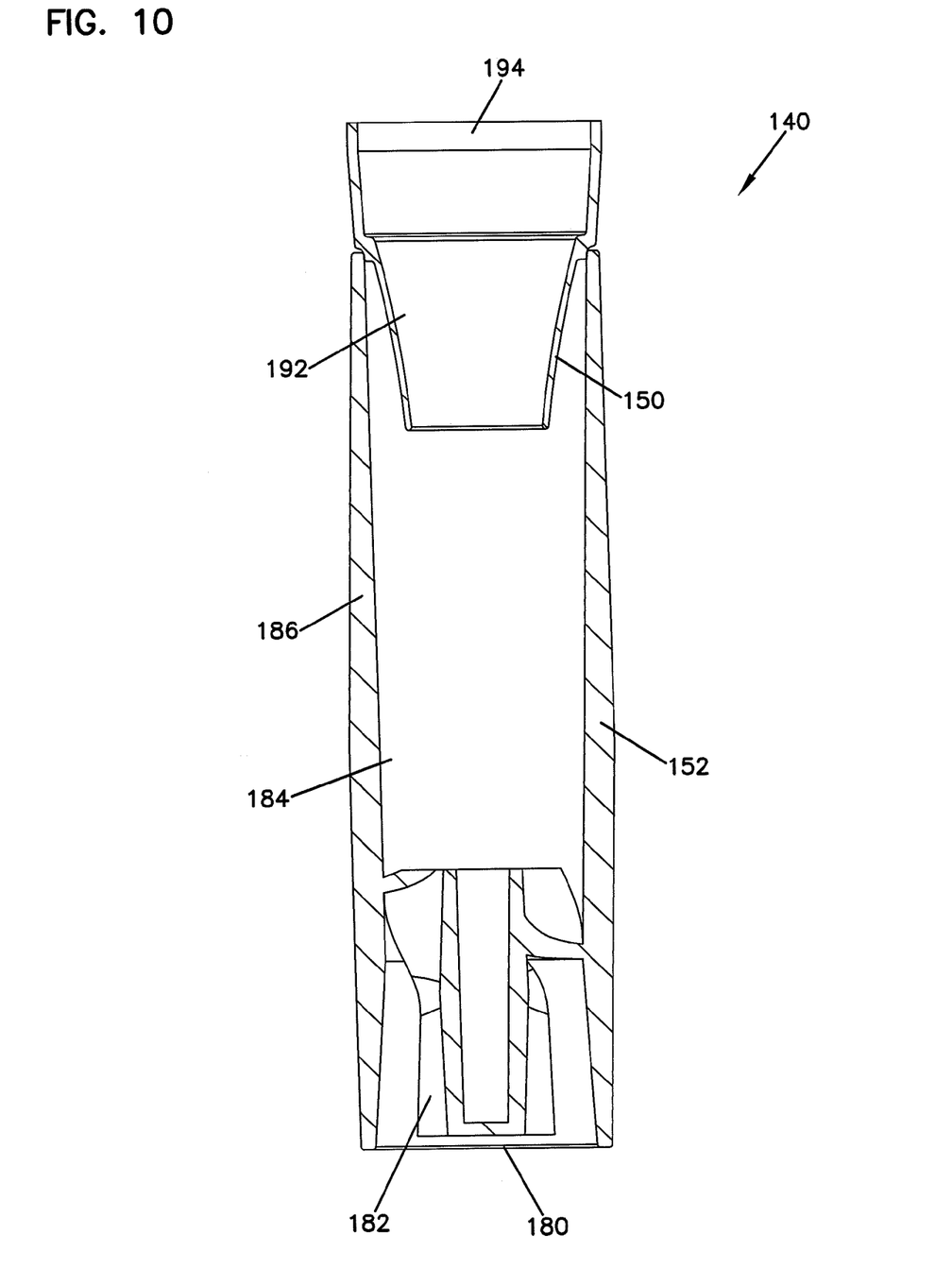
FIG. 10 is a sectional view of an exemplary inertial separator shown in FIG. 9.

Now referring to FIG. 10, an exemplary inertial separator 140 is shown in cross section. The inertial separator 140 includes a first part 150 and a second part 152. Environmental air can enter the inertial separator 140 through the first opening 180, and stationary veins 182 can cause the environmental air to swirl within the chamber 184. Particulates and water, as a result of centrifugal forces, have a tendency to move toward the chamber wall 186. As the air moves through the chamber 184, the water and particulates are directed toward the inertial separator scavenge outlet 190 shown in FIGS. 8 and 9 in the chamber wall 186. The water and particulates can then be removed via the scavenge outlet 149. As air within the chamber 184 moves into a secondary chamber 192, the air that passes through the second opening 194 can be cleaner than the air that passes through the first opening 180.

The inertial separator panel 146 can include any number of desired inertial separators 140 to provide the desired flow rate and volumetric flow. For example, the inertial separator panel can include at least about 25 inertial separators, can include at least about 50 inertial separators, can include at least about 75 inertial separators, and can include at least about 100 inertial separators.

The first wall 142 can be provided at an angle to assist with water drainage. For example, the first wall 142 can be provided at an angle that is not horizontal. In addition, the first wall 142, the second wall 144, or both can be provided extending at an angle that is not horizontal in order to provide inertial separators having varying sizes.

It is understood that the various embodiments, details and constructions of the assemblies and their features described above and illustrated in the attached Figures may be interchanged among the various embodiments while remaining within the scope of the invention. Additionally, it is understood that various modifications could be made to any of the assemblies and/or elements described herein above while remaining within the scope of the invention.

The techniques described herein and on the following pages can apply to a variety of equipment types, with a variety of sizes and specific configurations. The general characterizations herein are meant to be examples.

The above specification, examples and data provide a complete description of the manufacture and use of the composition of the invention. Since many embodiments of the invention can be made without departing from the spirit and scope of the invention, the invention resides in the claims hereinafter appended.

We claim:
1. A raincap precleaner comprising:
(a) a sleeve constructed for mounting on a vertically arranged air intake stack and having an air intake flow region for delivering intake air to the stack;
(b) a cover comprising a top portion having annular circumference and a depending flange portion extending from the annular circumference of the top portion, the cover being arranged relative to the sleeve to provide a precleaner area and precleaned air chamber; and
(c) a precleaner assembly provided extending around a periphery of the sleeve and in the precleaner area so that environmental air flows through the precleaner assembly and into the precleaned air chamber, and from the precleaned air chamber into the air intake flow region, the precleaner assembly comprising a plurality of inertial separators and a chamber for receiving particulate form the plurality of inertial separators.

2. A raincap precleaner according to claim 1, wherein the plurality of inertial separators comprises a panel of inertial separators.

3. A raincap precleaner according to claim 2, wherein the panel of inertial separators comprises an arrangement of inertial separators extending from a first wall to a second wall, and having a central opening therethrough sized to provide a flow of precleaned air.

4. A raincap precleaner according to claim 1, wherein the chamber comprises a scavenge chamber.

5. A raincap precleaner according to claim 4, further comprising a scavenge outlet in communication with the scavenge chamber.

6. A raincap precleaner according to claim 1, further comprising a screen for protecting the precleaner assembly from particulates in the environmental air.

7. A raincap precleaner according to claim 6, wherein the screen extends from the sleeve to the depending flange portion.

8. A raincap precleaner according to claim 7, wherein the screen comprises a pleated screen construction.

9. A raincap precleaner according to claim 8, wherein the pleated screen construction comprises a pleated screen provided between a first screen member and a second screen member.

10. A raincap precleaner according to claim 1, wherein the sleeve comprises a top edge and the depending flange portion comprises a bottom edge, and wherein the precleaner assembly is provided between the top edge and the bottom edge.

11. A method for precleaning intake air, the method comprising:
(a) feeding environmental air into a raincap precleaner according to claim 1.

12. A method according to claim 11, wherein the environmental air is cleaned in the precleaner assembly to provide precleaned air.

13. A method according to claim 12, wherein the precleaned air flows from the plurality of inertial separators into the air intake flow region and provides about a 180° turn.

14. A motor vehicle comprising an air intake system comprising an air cleaner, a vertically arranged stack for feeding air to the air cleaner, and a raincap arranged on the vertically extending stack to reduce rain and particulates from a falling into the vertically arranged stack, the raincap further comprising:
(a) a sleeve mounted on the vertically arranged air intake stack and having an air intake flow region for delivering intake air to the stack;
(b) a cover comprising a top portion having annular circumference and a depending flange portion extending from the annular circumference of the top portion, the cover being arranged relative to the sleeve to provide a precleaner area and precleaned air chamber; and
(c) a precleaner assembly provided extending around a periphery of the sleeve and in the precleaner area so that environmental air flows through the precleaner assembly and into the precleaned air chamber, and from the precleaned air chamber into the air intake flow region, the precleaner assembly comprising a plurality of inertial separators.

15. A motor vehicle according to claim 14, wherein the raincap and the air cleaner are separated by the vertically arranged stack.

16. A motor vehicle according to claim 14, wherein the plurality of inertial separators comprises a panel of inertial separators.

17. A motor vehicle according to claim 16, wherein the panel of inertial separators comprises an arrangement of inertial separators extending from a first wall to a second wall, and having a central opening therethrough sized to provide a flow of precleaned air.

18. A motor vehicle according to claim 14, wherein the chamber comprises a scavenge chamber.

19. A motor vehicle according to claim 18, further comprising a scavenge outlet in communication with the scavenge chamber.

20. A motor vehicle according to claim 14, further comprising a screen for protecting the precleaner assembly from particulates in the environmental air.

21. A motor vehicle according to claim 20, wherein the screen extends from the sleeve to the depending flange portion.

22. A motor vehicle according to claim 21, wherein the screen comprises a pleated screen construction.

* * * * *

UNITED STATES PATENT AND TRADEMARK OFFICE
CERTIFICATE OF CORRECTION

PATENT NO.       : 8,177,872 B2
APPLICATION NO.  : 12/863903
DATED            : May 15, 2012
INVENTOR(S)      : Nelson et al.

It is certified that error appears in the above-identified patent and that said Letters Patent is hereby corrected as shown below:

Col. 8, line 54, claim 1: "form the plurality" should read --from the plurality--

Signed and Sealed this
Eleventh Day of December, 2012

David J. Kappos
*Director of the United States Patent and Trademark Office*